United States Patent
Revol

(10) Patent No.: US 11,414,112 B2
(45) Date of Patent: Aug. 16, 2022

(54) METHOD AND SYSTEM FOR DETERMINING THE POINT LOCATION OF A STOPPED VEHICLE ON A STORAGE TRACK, USING VIRTUAL BEACONS

(71) Applicant: THALES, Courbevoie (FR)

(72) Inventor: Marc Revol, Upie (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/770,581

(22) PCT Filed: Jun. 13, 2019

(86) PCT No.: PCT/FR2019/000096
§ 371 (c)(1),
(2) Date: Jun. 5, 2020

(87) PCT Pub. No.: WO2020/249874
PCT Pub. Date: Dec. 17, 2020

(65) Prior Publication Data
US 2022/0135096 A1    May 5, 2022

(51) Int. Cl.
*G01S 19/50* (2010.01)
*G01S 19/40* (2010.01)
*B61L 25/02* (2006.01)
*G01S 19/25* (2010.01)

(52) U.S. Cl.
CPC .......... *B61L 25/025* (2013.01); *G01S 19/256* (2013.01); *G01S 19/40* (2013.01); *G01S 19/50* (2013.01); *B61L 2205/04* (2013.01)

(58) Field of Classification Search
CPC .. B61L 25/025; B61L 2205/04; G01S 19/256; G01S 19/40; G01S 19/50
See application file for complete search history.

(56) References Cited

U.S. PATENT DOCUMENTS
5,375,059 A    12/1994    Kyrtsos et al.

FOREIGN PATENT DOCUMENTS

| EP | 2 210 791 A1 | 7/2010 |
|---|---|---|
| EP | 3 306 272 A1 | 4/2018 |
| FR | 3 057 348 A1 | 4/2018 |
| WO | 2013/142946 A1 | 10/2013 |

*Primary Examiner* — Mathew Franklin Gordon
(74) *Attorney, Agent, or Firm* — BakerHostetler

(57) ABSTRACT

A method for determining the point location of a vehicle stopped on one storage track among a set of storage tracks, using virtual beacons is provided. It determines and compares the likelihood of a plurality of hypotheses as to the stopped location of the vehicle, corresponding to a first set of NBe predefined virtual beacons Be(i), i varying from 1 to NBe, the respective positions of which are known in an amount of one virtual beacon per storage track, by correlating the GNSS geo-positioning signals received at various synchronization reset times of a second set by the GNSS receiver located on board the vehicle with predicted GNSS geo-positioning signals of replicas expected for the various positions of the virtual beacons of the first set at the various times. The detected holding position of the vehicle is the position that corresponds to the maximum likelihood.

17 Claims, 7 Drawing Sheets

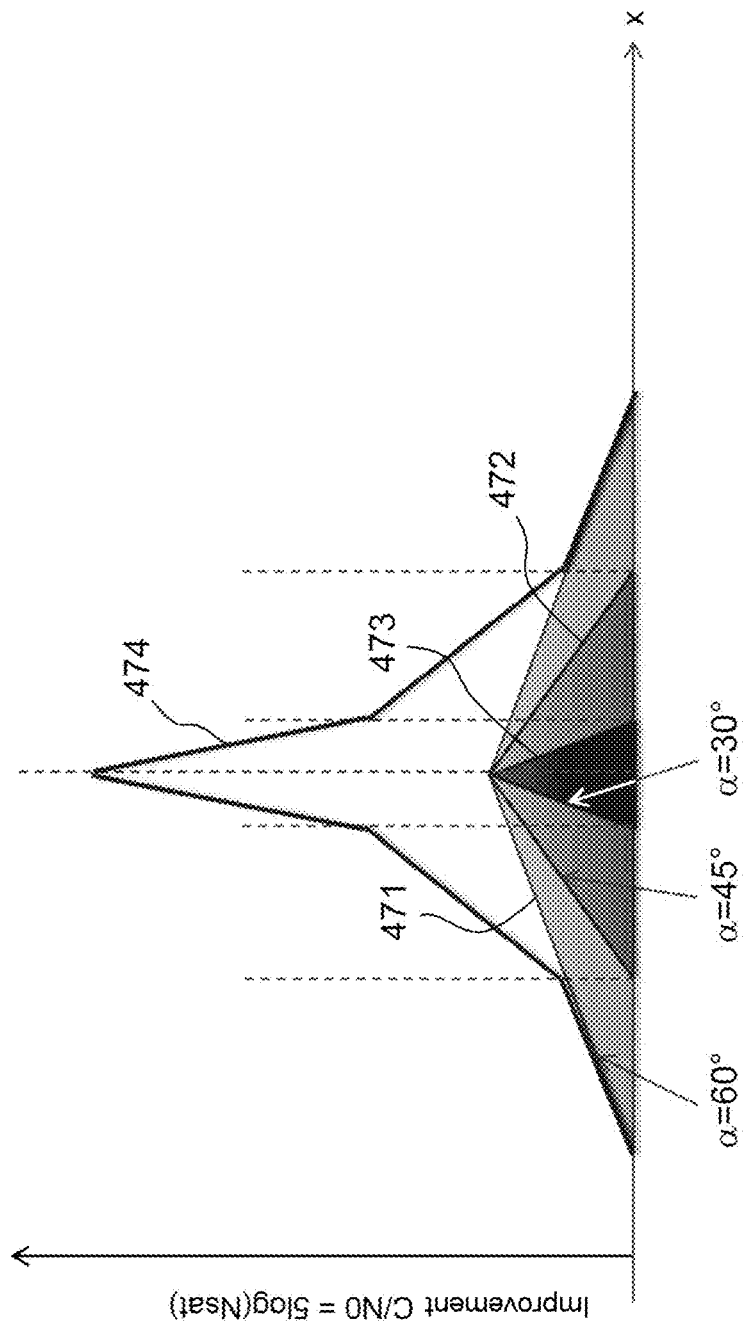

METHOD AND SYSTEM FOR DETERMINING THE POINT LOCATION OF A STOPPED VEHICLE ON A STORAGE TRACK, USING VIRTUAL BEACONS

CROSS-REFERENCE TO RELATED APPLICATIONS

This application is a National Stage of International patent application PCT/FR2019/000096, filed on Jun. 13, 2019, the disclosure of which is incorporated by reference in its entirety.

FIELD OF THE INVENTION

BACKGROUND

The present invention relates to the field of satellite geolocation. The invention more particularly relates to a method and system for determining the point location, i.e. determining instantaneously or in real time the time-stamped position, of a stopped vehicle held on one storage and/or departure track among a set of storage tracks, using virtual beacons.

The present invention also relates to a device for determining the point location of a vehicle parked and stopped on a departure track, said device being integrated into the system for determining point location according to the invention, and relates to a computer-program product to be executed or executed by said device for determining point location.

The present invention applies to any vehicle or means of locomotion, parked stopped on a storage and/or departure track.

As known, determining the storage and/or departure track of a stopped train, after it has been started up from cold, i.e. after the turn on or preparation of its on-board electronic and electrical equipment, is a key element in locating the train, no a priori information regarding the parking position of said train being available when the stopped train is started up from cold. Specifically, once the departure track of the train has been determined, the location of the train may be determined and kept updated during the subsequent movements of said train using proprioceptive sensors, such as for example odometers and/or an inertial measurement unit, and a track map.

Conventionally, the use of contactors placed on each storage track or of RFID beacons (RFID being the acronym of Radio-Frequency IDentification) in the context of the ETCS L2 standard (acronym of European Train Control System Level 2) allows, almost deterministically, after movement at low speed of the train, any doubt to be removed as to which section of storage track is concerned.

RFID beacons, the positions of which in all of the holding tracks are known, makes it possible to activate, on passage of the train, an RFID signal that is detected and dated by an on-board positioning device, and used to precisely reset, to within one meter and with a high integrity, other on-board locating means, such as for example the odometer.

The drawback of the use of contactors or RFID beacons in this system for determining point location is the fact that such a system requires substantial infrastructure, in terms of the number of RFID beacons required to be installed on the storage tracks and of the maintenance of said installed beacons. Another drawback is the fact that before being able to be located by an RFID beacon or a contactor the train must start a "blind" movement at very low speed, this requiring prior authorization by the authorities in charge of traffic management.

Moreover, known solutions based on standard GNSS (Global Navigation Satellite System) receivers are often envisioned as a way of contributing to achieving a first-level location with an "on-track" precision of sufficient granularity to identify the storage track closest to the estimated position.

Many documents, such as for example a first document, U.S. Pat. No. 5,375,059 A, describe systems and methods for improving the precision of real-time location of an autonomous land vehicle that use a global satellite positioning system and a set of beacons.

However, the always possible presence of distortions of the received signal, which may be related to multipaths, or to local interference, the train being stopped, may induce position errors much larger than the spacing between tracks, thus risking making the determination of the track corrupted in terms of an integrity loss, even after a long integration (in terms of integration duration) of the computed position.

Generally, the main known limitations, related to use of a standard GNSS approach, are the following:

the availability of the GNSS signals may be insufficient in the case of land vehicles stored on the ground, for reasons of signal masking or of unavailability of satellite signals; and/or the quality of the measurements may be degraded, this degradation taking the form of a measurement bias due to the effect of propagation disruptions, such as for example multipaths or local interference in the reception environment; and/or the precision and integrity of the location measurements may be substantially lower than that provided by a more robust physical beacon, and does not allow the safety objectives sought for rail traffic, in particular those as regards the delivered position having a SIL4 integrity level (acronym of Safety Integrity Level 4) such as defined in standard IEC-61508, to be achieved.

A first technical problem is therefore to provide a method and system for determining the point location of a vehicle, stopped on a storage track, using a virtual beacon, associated with said departure track, that it is sought to identify before departure, which allow, via use alone of the measurements delivered by a standard GNSS receiver, the departure track on which the stored train is found to be identified, with a high safety integrity level, among a set of departure tracks, which are close to one another, after the stopped train has been turned on at said departure track.

A second technical problem is to provide a method and system for determining the point location of a vehicle, stopped on a storage track, using a virtual beacon, associated with said departure track, that it is sought to identify before departure, which allow, via use alone of the measurements delivered by a standard GNSS receiver, the departure track on which the stored train is found to be identified, among a set of departure tracks which are close to one another, and which guarantee a high integrity performance and a high robustness performance with respect to the effect of propagation disruptions or local interference in the reception environment.

SUMMARY OF THE INVENTION

To this end, one subject of the invention is a method for determining the point location of a vehicle stopped on one storage track among a set of storage tracks, using virtual beacons.

The location-determining method is implemented by a system for determining point location comprising: a GNSS receiver, located on board the vehicle, able to directly measure pseudo-distances set to a synchronized local time base within a synchronization imprecision time range, using geo-positioning signals emitted by GNSS geo-positioning satellites visible to said GNSS receiver; and an electronic processing unit that is external to or integrated into the GNSS receiver.

The method for determining point location is characterized in that it comprises a set of steps in which the likelihood of a plurality of hypotheses as to the stopped location of the vehicle, corresponding to a first set of an integer number NBe of predefined virtual beacons Be(i), i varying from 1 to NBe, the respective positions of which are known in an amount of at least one virtual beacon per storage track, is determined and compared by the electronic processing unit by correlating the GNSS geo-positioning signals, received at various times of a second set by the GNSS receiver located on board the vehicle, with predicted GNSS geo-positioning signals of replicas expected for said various positions of the virtual beacons Be(i) of the first set at the various times, and the detected holding position of the vehicle is the position that corresponds to the maximum likelihood.

According to particular embodiments, the method for determining the point location of a vehicle comprises one or more of the following features, which may be implemented alone or in combination:

- to decrease the mismatch due to a poor synchronization of the local time reference of the GNSS receiver with respect to the time of the GNSS global positioning system, the imprecision time range of the synchronization of the local clock is covered by the electronic processing unit by dividing in a predefined way said imprecision time range into time segments, respectively represented by synchronization reset times tk, k varying from 1 to Nk, with Nk designating the number of synchronization reset times in the imprecision time range, the correlations of the GNSS geo-positioning signals received by the on-board GNSS receiver being performed at said synchronization reset times tk;
- the correlations of the GNSS geo-positioning signals received by the on-board GNSS receiver for the various positions P(i) of the virtual beacons Be(i), i varying from 1 to NBe, and at the various times tk, k varying from 1 to Nk, are multi-satellite correlations with corresponding replica GNSS signals expected for each position P(i) at the time tk and from the satellites Sat(i, j, k) visible from said position P(i) of the virtual beacon Be(i) at the time tk, the multi-satellite correlation for the position P(i) at the synchronization reset time tk, i varying from 1 to NBe and k varying from 1 to Nk, being equal to the quadratic sum, over the set of the satellites visible from the position P(i) at the reset time tk, of the elementary correlations between the actual GNSS signal received for the position P(i) at the time tk by the GNSS receiver and the GNSS replicas expected at the time tk and at the position P(i) from the satellites Sat(i, j, k) visible from the beacon Be(i) at the time tk;
- the set of steps comprises an initialization phase, a phase of searching for the position of the virtual beacon closest to the parking position of the vehicle using a predefined strategy, and a phase of exploiting the searching phase, in which phase the storage track Vi0 is identified based on the virtual beacon B(ei0) estimated to be closest to the vehicle, and a priori knowledge of the positions P(i) of the virtual beacons Be(i), which positions are set and predefined, i varying from 1 to NBe;
- the initialization phase of the set of steps comprises a first initialization step in which the first set of possible positions P(i) of the virtual beacons Be(i), i varying from 1 to NBe, corresponding to the possible storage tracks Vi of the vehicle, is determined from a database of topographical data, which database may be external to the GNSS receiver or may be included in a database memory of the GNSS receiver, and synchronization reset times tk, k varying from 1 to Nk, forming a second set of hypotheses, are determined in the synchronization imprecision time range so as to be substantially regularly spaced apart, Nk being an integer higher than or equal to 3, the synchronization imprecision time range being included in the temporal correlation domain of a GNSS PRN code sequence or being determined using an integrity-protection time radius computed from time data of an RAIM function, which is either integrated into or external to the GNSS receiver;
- the difference between the actual position of the GNSS receiver along the storage track on which the vehicle is parked and the position of the associated virtual beacon is smaller than an imprecision spatial interval the equivalent temporal effect of which on the temporal correlation precision is clearly lower than the temporal correlation domain of the GNSS PRN code sequence used;
- the phase of searching for the closest virtual beacon comprises a second step in which: the on-board GNSS receiver receives the real GNSS signals at the synchronization reset times tk, k varying from 1 to Nk; and the electronic processing unit determines, for each synchronization reset time tk of the second set of hypotheses, k varying from 1 to Nk, and for each possible position P(i) of the virtual beacon Be(i) of the first set, i varying from 1 to NBe, the GNSS replica signals expected by the GNSS receiver at the positions P(i) and times tk for each visible satellite Sat(i, j, k) at the local time tk of the receiver, i varying from 1 to NBe and k varying from 1 to Nk; then for each reset time tk of the second set and for each position P(i) of the virtual beacons of the first set, the electronic processing unit determines elementary correlations between, on the one hand, the signals of the GNSS replicas expected at the various parking positions P(i) and various synchronization reset times tk and from the various satellites visible at each time tk and the real GNSS signals received at the synchronization reset times tk by the GNSS receiver located on board the vehicle;
- the phase of searching for the virtual beacon closest to the vehicle comprises a third step, executed after or in parallel with the second step, in which, for each reset time tk of the second set and for each position P(i) of the virtual beacons of the first set, the electronic processing unit determines multi-satellite correlations, forming a value of the likelihood function, and equal, for each position P(i) of the virtual beacons of the first set and each reset time tk of the second set, to the quadratic sum of the elementary correlations between the signal between the GNSS signal received by the GNSS receiver at the time tk and the replica signals expected, at the time tk for the position P(i) of the virtual beacon, from the visible satellites Sat(i, j, k) visible from the position P(i) at the time tk;
- the phase of searching for the closest virtual beacon comprises a fourth step, executed after the third step, in which the electronic processing unit determines the position P(i0) of the virtual beacon and the reset time tk0 that maximizes the likelihood function for the first set of positions P(i) and the second set of reset times tk, the position P(i0) thus determined being the position of the virtual beacon Be(i0) detected to be closest to the on-board receiver;

the method for determining point location furthermore comprises a fifth step, executed after the fourth step, in which the electronic processing unit identifies the storage track on which the vehicle is stopped on the basis of the position P(i0) of the virtual beacon detected to be closest and of a lookup table mapping all of the virtual beacons to all of the storage tracks; and/or the electronic processing unit delivers information on the detected synchronization reset time tk0 to a mechanism for correcting a drift in the local clock of the GNSS detector; and/or the electronic processing unit raises an alarm in case of failure to identify the storage track and starts exploration in a broader synchronization imprecision time domain;

for each virtual-beacon position P(i), the set of satellites visible at a given time tk from all the virtual beacons Be(i), i varying from 1 to NBe, is identical and independent of the index i of order of the virtual beacons and dependent on the time tk only;

the integrity of the location is checked via an additional step in which it is verified that the maximum likelihood is higher than a predefined safety threshold guaranteeing the integrity of the location.

Another subject of the invention is a device for determining the point location of a vehicle stopped on one storage tack among a set of storage tracks, using virtual beacons, comprising: a GNSS receiver, located on board the vehicle, able to directly measure pseudo-distances set to a synchronized local time base within a precision time range, using geo-positioning signals emitted by GNSS geo-positioning satellites visible to said receiver; and an electronic processing unit that is external to or integrated into the GNSS receiver.

The device for determining point location is characterized in that the electronic processing unit is configured to: determine and compare the likelihood of a plurality of hypotheses as to the stopped location of the vehicle, corresponding to a first set of an integer number NBe of predefined virtual beacons Be(i), i varying from 1 to NBe, the respective positions of which are known in an amount of at least one virtual beacon per storage track, by correlating GNSS geo-positioning signals received at various times of a second set by the GNSS receiver located on board the vehicle with predicted GNSS geo-positioning signals of replicas expected for said various positions of the virtual beacons of the first set at the various times; and detecting the current parking position of the vehicle to be the position corresponding to the maximum likelihood.

According to particular embodiments, the device for determining the point location of a vehicle comprises one or more of the following features, which may be implemented alone or in combination:

to decrease the mismatch due to a poor synchronization of the local time reference of the GNSS receiver with respect to the time of the GNSS global positioning system, the electronic processing unit is configured to cover the imprecision time range of the local clock by dividing in a predefined way said imprecision time range into time segments, respectively represented by synchronization reset times tk, k varying from 1 to Nk, with Nk designating the number of synchronization reset times in the imprecision time range, the correlations of the GNSS geo-positioning signals received by the on-board GNSS receiver being performed at said synchronization reset times tk; and the correlations of the GNSS geo-positioning signals received by the on-board GNSS receiver at the various positions P(i) of the virtual beacons Be(i), i varying from 1 to NBe, and at the various times tk, k varying from 1 to Nk, are multi-satellite correlations with corresponding replica GNSS signals expected for each position P(i) at the time tk and from the satellites Sat(i, j, k) visible from said position P(i) of the virtual beacon Be(i) at the time tk, the multi-satellite correlation for the position P(i) at the synchronization reset time tk, i varying from 1 to NBe and k varying from 1 to Nk, being equal to the quadratic sum, over the set of the satellites visible from the position P(i) at the reset time tk, of the elementary correlations between the real GNSS signal received for the position P(i) at the time tk by the GNSS receiver and the GNSS replicas expected at the time tk and at the position Pi from the satellites Sat(i, j, k) visible from the beacon Be(i) at the time tk;

the electronic processing unit is configured to determine the synchronization imprecision time range by including it in the temporal correlation domain of a GNSS PRN code sequence or by computing an integrity-protection time radius from time data of an RAIM function, the RAIM function being integrated into or external to the GNSS receiver.

Another subject of the invention is a system for determining the point location of a vehicle stopped on one storage track among a set of storage tracks, using virtual beacons, comprising a GNSS global satellite geo-positioning system; and a device for determining the point location of a vehicle such as defined above, preferably enhanced by an RAIM function implemented within the GNSS receiver or within a second GNSS receiver separate from the first GNSS receiver; the vehicle being a land vehicle, parked on a land storage track, preferably a train parked on a storage track, or a sea vehicle, held on a seaway.

Another subject of the invention is a computer-program product containing computer-readable instructions that, when they are executed on a processing unit, cause the processing unit to execute the method, such as described above, for determining the location of a vehicle stopped on one storage track among a set of storage tracks, using virtual beacons.

BRIEF DESCRIPTION OF THE DRAWINGS

The invention will be better understood on reading the following description of a plurality of embodiments, which description is given merely by way of example and with reference to the appended drawings, in which:

FIG. 7 is a graphical view of an example of a resultant multi-satellite correlation or detection function obtained after quadratic summation of the outputs of matched filtering operations or of elementary correlation functions for satellites with various satellite visibility incidences.

DETAILED DESCRIPTION

Figure 1:
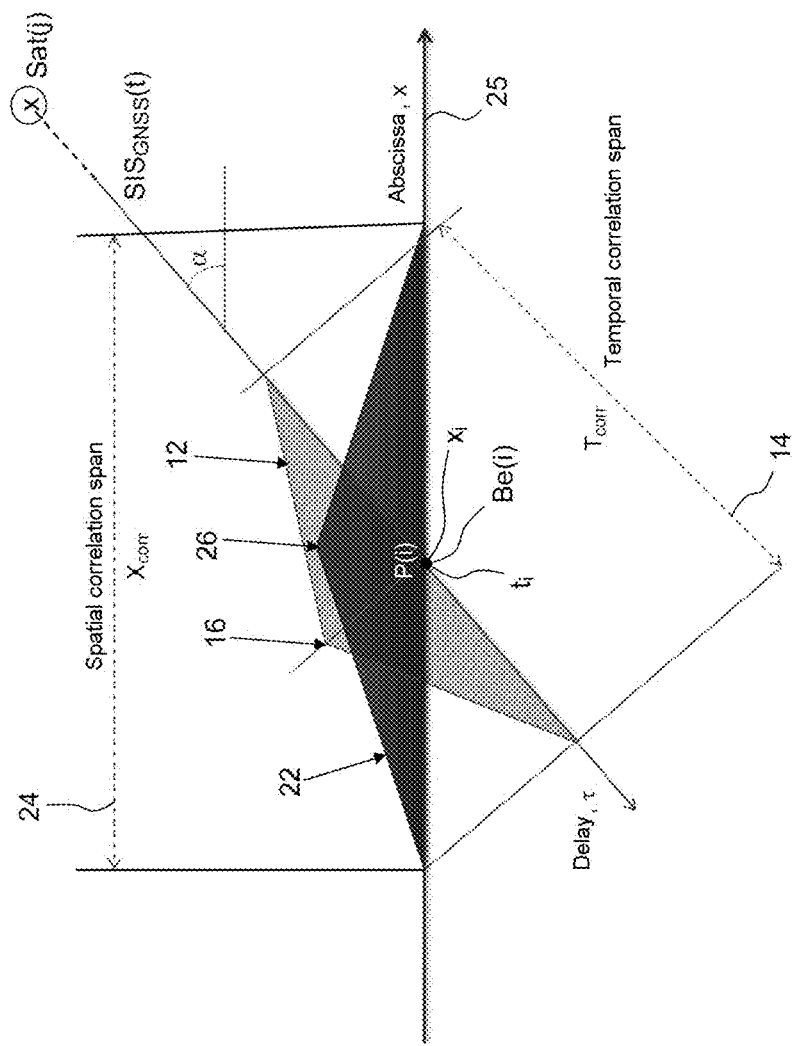
FIG. 1 illustrates the relationship between the temporal correlation and the spatial correlation.

The general objective of the method and system according to the invention for determining the location of a land vehicle, a train for example, held stopped on a storage and/or departure track, is to make possible the comparison of the likelihood of a plurality of hypotheses as to the location of startup of the train, said location hypotheses corresponding to predefined and known storage or parking positions, by verifying the consistency of or by correlating GNSS signals received by a standard GNSS receiver located on board the train with the predicted GNSS signals of replicas expected for these various positions.

The storage positions of the trains for each departure track are assumed to be sufficiently precise to guarantee that the on-board GNSS receiver is positioned at a parking position that is within one meter of a visual marker, which is placed at a point along the departure track and that corresponds to a single virtual beacon of said departure track.

However, if the stopped position of the train cannot be ensured to within one meter, it will then be necessary to evaluate the likelihood of each of the stopped-position hypotheses in a spatial uncertainty interval of length larger than one meter and to explore the spatial uncertainty interval in each of the tracks with an increment of one meter.

In contrast to the use of RFID beacons, the method and system for determining the location of the train according to the invention do not require the train to move, even at low speed, to allow the departure track to be detected (before its passage over railroad switches).

In the case where the stopped position of the train may be ensured to within one meter, the possible reception positions of the expected GNSS signals are given by positions P(i) of parking points that correspond to virtual beacons Be(i) in an amount of one virtual beacon per storage track. In this case, the beacon Be(i) and its associated storage track Vi may be designated by a common numbering index i, i varying from 1 to NBe, NBe designating both, in this particular case, the number of beacons and the number of tracks of the set of possible storage and departure tracks on which the train may be parked. The positions P(i) of the virtual beacons, i varying from 1 to NBe, form a first set of hypotheses as to the storage and departure position of the train, and may be evaluated in parallel and/or in series depending on the processing carried out.

In the case where the stopped position of the train cannot be ensured to within one meter, the possible reception positions of the expected GNSS signals are given by positions P(i) of parking points that correspond to virtual beacons Be(i) in an amount of at least one virtual beacon per storage track Vs, s being a numbering index of the storage and departure track Vs that varies from 1 to NV and i being a numbering index of the virtual beacon Be(i) that varies from 1 to NBe, NV designating the number of tracks Vs of the set of possible storage and departure tracks on which the train may be parked, and NBe designating the total number of virtual beacons. Assuming a number NBV, higher than or equal to 1, of virtual beacons per track Vs, said beacons being spaced apart consecutively by at most one meter, the numbering index i of the virtual beacon may vary from 1 to NBe according to the following relationship:

$$i=(s-1)*NBV+r$$

the numbering index s of the storage track varying from 1 to NV and r being an integer index of order of the beacons within a same given track.

The positions P(i) of the virtual beacons, i varying from 1 to NBe, form a first set of hypotheses as to the storage and departure position of the train, and may be evaluated in parallel and/or in series depending on the processing carried out.

A first advantage of the method for determining and system for determining point location according to the invention is to be able to test a plurality of hypotheses as to possible parking positions P(i) of the train in terms of storage track, without having to move the train.

A second advantage of the method for determining point location and of the system for determining point location according to the invention, with respect to conventional locating methods and systems, which are used with standard GNSS receivers, is the fact that it allows a more robust likelihood ratio to be established that evaluates various possible virtual-beacon or storage-track solutions on the basis of purely energetic linear criteria, without having to make use of estimators of arrival time such as those conventionally implemented in GNSS receivers, which become non-linear in the presence of distortions in the waveform of the received GNSS signal, as caused by multipaths or various sources of interference.

A third advantage of the method for determining and system for determining point location according to the invention is the fact that it makes it possible to decrease the estimation to the spatial dimension alone, by neglecting time, which for its part is predefined a priori by a set of time segments into which the imprecision interval of the local clock with respect to the clock of the GNSS system is divided, and the width of which, which is sufficiently small, makes it possible, during the estimation of the position of the departure track on which the train is located, to make the contribution of the temporal indeterminateness to the indeterminateness of the conjoint position estimation negligible with respect to the contribution of the spatial indeterminateness of the actual position of the train with respect to the position of the train on the track.

Below, the expression "virtual beacon" is understood to mean a predefined position, or reference point, the spatial coordinates of which are precisely known.

Below, the expression "current time" is understood to mean the time t measured in the local time base of the standard GNSS receiver included in the locating device according to the invention.

Below, the expression "synchronization reset time" of rank k, k being an integer comprised between 1 and Nk, is understood to mean a time comprised in the kth segment of coverage of the imprecision time range of the synchronization of the local clock of the standard GNSS receiver.

A GNSS (acronym of Global Navigation Satellite System) satellite positioning system is for example the GPS (acronym of Global Positioning System) system, the Galileo system, the Glonass system or any other equivalent system.

It will be recalled that the C/A (acronym of Coarse/ Acquisition) acquisition code in the GPS case is a digital signal composed of 1023 chips and that repeats every millisecond. It will be noted that the term "chip" used in GNSS techniques is not to be confused with the term "bit", which is used to define a unit of information.

The concept of the invention, according to a first aspect, is based on conjoint implementation:

of a comparison of a likelihood function of a set restricted integer number NBe of predefined and known parking positions P(i), i varying from 1 to NBe, corresponding to the virtual beacons Be(i); and of an algorithmic core that implements processing by multi-satellite correlation, i.e. correlation involving signals from satellites at various inclinations, such a core being disclosed in a second document, EP 3 306 272 A1, and that checks the consistency of the GNSS signals received by the on-board GNSS receiver with the GNSS signals expected for the various hypotheses as to the positions P(i) of the train on the corresponding departure tracks Vi.

In contrast to conventional locating methods and systems, which use a standard GNSS receiver located on board a stopped vehicle and a direct estimation of position, and which thus run the risk of there being substantial defects in the integrity of the estimated position, this risk increasing if the train is stopped and the GNSS receiver receives multipaths that vary very slowly and local interference, the method and system for determining point location according to the invention implement filtering that is multi-satellite, i.e. multidimensional, along all the axes of sight of the visible satellites and that is tailored with respect to positions of a first set of predefined positions P(i) of virtual beacons and received times tk of a second set of predefined possible times of reset of the synchronization between the local time base and the time base of the GNSS system.

Specifically, following the "search strategy" of the method for determining point location of the invention, the energy of the location estimator, i.e. the amplitude of the quadratic sum of the amplitudes of the elementary correlators associated respectively with the exploitable visible satellites, is maximized for the various hypotheses as to the parking place of the train, i.e. for the first set of positions Pi of the virtual beacons Be(i), i varying from 1 to Nbe, the train being assumed to be stopped.

According to a first aspect of the concept of the invention, the matched multi-satellite or multidimensional filtering is carried out via correlation of the GNSS signals received by the GNSS receiver with the signals of the replicas expected at a current reception time t for the spatial points Pi corresponding to the possible parking positions of the GNSS receiver, i.e. the positions of the virtual beacons Bei, i varying from 1 to Nbe. The code of the local replica signal received by the GNSS terminal at the current reception time being based on an emission of set phase from the one or more visible satellites, the reception phase of the replica signal expected at the current reception time t is adjusted depending on the movement of said satellite, the path of which is computed from ephemerides, on the various hypotheses made as to the positions P(i) and on the current reception time t, the time base of the GNSS receiver being assumed to have been synchronized beforehand via a conventional PVT (acronym of Position Velocity Time) computation the imprecision of which is defined by an imprecision time interval, of width equal, for a conventional GNSS receiver of GPS type for example, to a few hundred nanoseconds. In practice, the uncertainty in the estimation of the GNSS time is due to the same imperfections, i.e. to the same biases, as the uncertainties in the estimation of the position in the presence of multipaths or interference. The locating method according to the invention allows this uncertainty to be decreased by making provision to explore the domain using an estimating method that is not affected by these primary measurement defects.

Assuming a perfect synchronization between the local time base of the GNSS receiver and the time base of the GNSS system, the phase of the GNSS signal actually received by the GNSS receiver varies, for its part, naturally with time depending on the set position of the virtual beacon associated with the storage track; a perfect match and maximization of the likelihood function is then achieved and maintained over time when the phase of the signal actually received locally corresponds to the phase of the signals of replicas expected for the parking position in which the GNSS receiver is located.

However, in practice, such a consistency between the real GNSS signals received by the GNSS receiver at the current time t and the expected replica signals, which are predicted and computed, for various parking positions P(i), i varying from 1 to NBe, cannot be ensured perfectly, for no other reasons than:

the error in the synchronization of the local time of the GNSS receiver with the time of the GNSS system, which necessarily contains an estimation imprecision, or even an instability over time, caused by the intrinsic imprecision of the local time base of the GNSS receiver (for example a temperature-compensated quartz oscillator) being higher than the imprecision in the time base of the GNSS system (in general an atomic clock meeting the constraints of space flight);

errors specific to the GNSS system and radioelectric-signal propagation errors that are not perfectly corrected by the various compensation models, such as for example propagation errors due to the ionosphere and/or troposphere, antenna lever effects, errors in the ephemerides of and the temporal synchronization between the satellites.

It will be noted that residual propagation errors after compensation by the models, which remain of the order of a few meters, only have a small impact on the level of the spatial correlation function; for example, the spatial correlation span has a length of 300 meters in a GPS C/A signal mode, and these residual propagation errors vary little over the time it takes to start up the stopped train, which is 10 minutes or less, and introduce no noise or additional bias into the determination of the maximum spatial correlation, as a function of the various possible parking positions P(i) of the train.

Therefore, an imprecision in the synchronization of the local time base of the GNSS receiver with respect to the GNSS system alone could lead to a significant loss of sensitivity in the determination of the point location of the train, if the synchronization discrepancy between the local time base of the GNSS receiver and the time of the GNSS system becomes larger than the duration of a chip of a pseudo-random GNSS code, for example equal to 1 ps in the case of a GPS C/A code.

To mitigate this synchronization imprecision and according to a second aspect, the concept of the invention is based on a reset of the temporal synchronization, employing a search for the maximum spatial correlation at the various holding positions P(i) for a plurality of different local reception times tk of a given second set of synchronization times, which are dispersed over a synchronization reset time interval, which time interval is centered on a resolved reference synchronization time, so as to sample the residual uncertainty in resolved time. By way of example, in the case of a C/A code of a GPS sequence, a synchronization reset interval, of width equal to 1 µs, could be explored by sampling in increments of 0.2 µs.

Thus, by carrying out in parallel a plurality of filtering operations that are multidimensional in terms of visible satellites and their angles of incidence, that are tailored, in terms of predicted replicas of the received signals, to the various possible holding positions of the train, and that are computed for various hypotheses as to the reset required to the local time in the temporal uncertainty domain, the imprecision in the local synchronization is covered and the departure track on which the stopped train is located may be identified.

It will be noted that among the possible approaches to determining the size of the temporal uncertainty domain, i.e. the temporal synchronization interval to be taken into account, one approach consists in computing a protection time radius for the time measurement from time information of the RAIM function (acronym of Receiver Autonomous Integrity Monitoring, well-known in GNSS systems) which allows biases (i.e. errors) in satellite axis-of-sight measurements likely to have exceeded a maximum protection time radius or alarm radius corresponding to the detection of a GNSS system integrity fault to be detected.

The temporal exploration domain or synchronization reset time interval is thus bounded by the protection radius of the RAIM. The RAIM function guarantees, with the desired confidence (in terms of the probability of error non-detection Pnd and of the probability of false alarm Pfa), the detection of any satellite axis-of-sight errors that would lead to an error in the time larger than this protection radius, contrary to the time-measurement precision alone, which assumes an absence of errors in the measurements with respect to satellite axes of sight, i.e. an absence of integrity faults in the GNSS system (failure of at least one satellite). This protection radius, which is computed for each measurement epoch (typically each second), is assumed to be sufficiently stable to allow the time domain to be explored.

FIG. 1 illustrates the equivalence between the time synchronization by temporal correlation and the position synchronization by spatial correlation. This figure shows a graphical representation, as a function of time, of a function 12 of temporal correlation between the GNSS signal SIS-$_{GNSS}$(t) received by a GNSS receiver of a geo-positioning satellite Sat(j) and the signal expected for a point of abscissa Xi of beacon Be(i) and at a synchronization time ti.

The span $T_{corr}$ 14 of this temporal correlation function 12 corresponds to the duration of a chip of a GNSS code sequence. The term "chip", as used in GNSS techniques, designates a binary piece of information that modulates the signal of a GNSS code sequence and differs from the notion of a bit, which is used to define a unit of information. For example, the duration of a chip for a GPS. The maximum 16 of this temporal correlation function 12 is obtained at the time ti of synchronization of the expected signal with the GNSS signal $SIS_{GNSS}$(t) received by the GNSS receiver.

FIG. 1 also shows a one-dimensional graphical representation, as a function of the abscissa X about the position P(i) associated with the virtual beacon Be(i), of a function 22 of equivalent spatial correlation between the GNSS signal received by the receiver from the geo-positioning satellite Sat(j) and the signal expected for the point Be(i) of abscissa Xi at the synchronization time ti and at the position Xi of the virtual beacon Be(i).

The span $X_{corr}$ 24 of this spatial correlation function 22 corresponds to the projection of the temporal correlation span $T_{corr}$ 14 onto an axis 25 of variation in the position of the GNSS receiver about the virtual beacon Be(i). The spatial correlation span $X_{corr}$ and the temporal correlation span $T_{corr}$ are related by the formula:

$$X_{corr}=c*T_{corr}/\cos(\alpha j)$$

in which:
$X_{corr}$ is here the length of the span of the spatial correlation function;
c is the speed of light;
$\alpha j$ is the angle of incidence of the satellite signal emitted by the satellite Sat(j), j being comprised between 1 and NSat with respect to the direction of movement of the vehicle;
the operator "*" represents the multiplication sign.

The maximum 26 of this temporal correlation function 22 corresponds to the abscissa of synchronization of the expected GNSS signal with the signal received by the GNSS receiver from the satellite Sat(j), it indicates the position closest to the virtual beacon Be(i). Here, in FIG. 1, the synchronization being assumed to have been achieved exactly, the maximum 26 corresponds to the abscissa Xi of the position P(i) of the virtual beacon Be(i).

Figure 2:
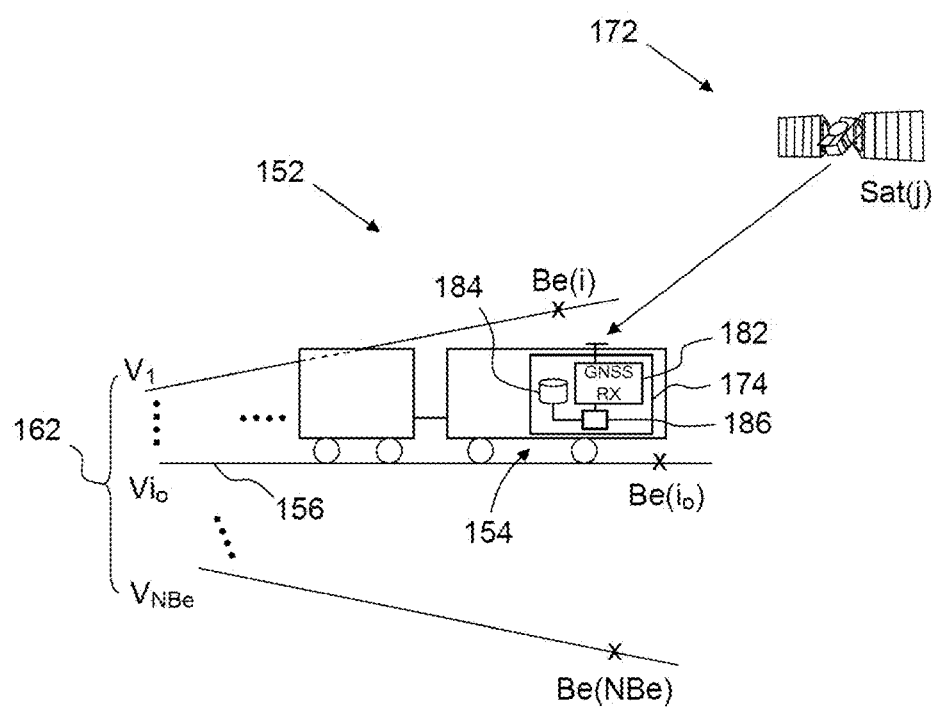
FIG. 2 is a view of the general architecture of a system according to the invention for determining the point location of a stopped vehicle, here a train held on one storage and departure track of a set of storage and departure tracks the topography of which is known.

In FIG. 2 and according to the invention, a system 152 for determining the point location of a train 154 stopped on a starting track 156, which point location is unknown a priori to the train but forms part of a set 162 of starting tracks Vi, i varying from 1 to NBe, the topography of which is known, comprises a GNSS satellite global-positioning system 172 and a device 174 for determining the point location of the train and the identification of the departure track on which said stopped train is being parked.

The on-board device 174 for determining point location comprises a conventional standard GNSS receiver 182 and a database 184 of topographical data, which database stores the topography of the tracks Vi and of the positions P(i) of the virtual beacons Be(i) respectively associated therewith.

The on-board device 174 for determining point location also comprises an electronic processing unit 186 for determining point location, which is connected to the standard GNSS receiver 182 and to the database 184 of topographical data.

Figure 3:
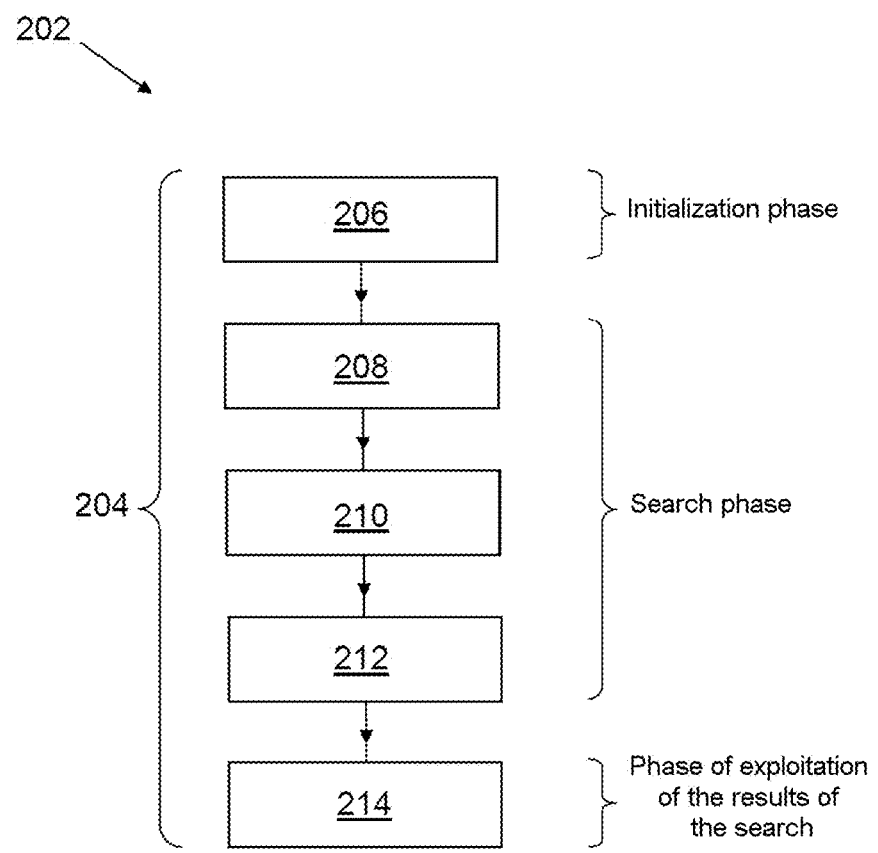
FIG. 3 is a general flowchart of a method according to the invention for determining the point location of a stopped vehicle, here a train parked on one storage and departure track of a set of storage and departure tracks the topography of which is known, said method for determining point location being implemented by the system for determining point location of FIG. 2.

The device 174 for determining point location is configured to implement a method 202 for determining point location, which method is illustrated in a general way in FIG. 3.

According to FIG. 3 and the most general embodiment of the method for determining point location, the method 202 for determining point location according to the invention comprises a set 204 of steps, the steps being configured to implement a strategy for searching for the position of the virtual beacon that best matches the position of the train 154, i.e. moreover to identify the virtual beacon Be(i$_0$) closest to the location of the GNSS receiver located on board the train 154, and therefore the associated starting track Vi0, by exploiting the received GNSS signal and the a priori knowledge of the positions P(i) of the virtual beacons Be(i), which are set and predefined, this knowledge being provided by the database of topographical data on the set 162 of starting tracks Vi, i varying from 1 to NBe.

The search for the virtual-beacon position that is the best match to the actual position of the train parked in its starting position, and of its on-board GNSS receiver 182, is carried out via correlation of the GNSS signals received by the GNSS receiver 182 from various visible satellites Sat(j) with the expected replica code signals of these various satellites, which are generated, at a given local reference time t of the GNSS receiver, for the various positions P(i) of the virtual beacons Be(i), i.e. the various parking positions in terms of track Vi, for i varying from 1 to NBe.

Furthermore, to decrease the invalidity caused by a poor synchronization of the local time reference with respect to the system time of the GNSS global-positioning system, the synchronization uncertainty domain is covered by dividing it, using a predefined division increment, into time segments that are respectively represented by reset times tk, k varying from 1 to Nk with Nk designating the number of synchronization reset times. For example, for a synchronization imprecision or uncertainty domain shorter than the duration of 1 μs, this making it possible to remain within the temporal correlation domain of a PRN code of a GPS C/A sequence, increments of duration shorter than or equal to 200 μs will possibly be considered.

The various parking positions P(i) are stored in the database of topographical data on the virtual beacons, which database may be external to the GNSS receiver as for example illustrated in FIG. 2 or may be included in the database memory of the GNSS receiver.

The set 204 of steps of the general method 202 for determining the point location of a stopped train on one starting track of a set of parking tracks comprises an initialization phase including a first step 206, a phase of searching for the virtual beacon that is the best match, including second, third and fourth steps 208, 210, 212, and a phase of exploiting the results of the search, including a fifth step 214.

In the initialization first step 206, a first set of possible positions P(i) of the virtual beacons Be(i), i varying from 1 to NBe, corresponding to the possible storage tracks Vi of the vehicle, here a train, is determined from the database of topographical data. It is assumed that the difference between the actual position of the GNSS receiver along any given storage track of the train and the position of the virtual beacon associated with said storage track is smaller than a predefined spatial imprecision interval, mastery of which is ensured via driving constraints placed on the driver of the train when he is storing it.

In the same initialization first step 206, synchronization reset times tk, k varying from 1 to Nk, forming a second set of hypothesis data, are determined in a synchronization imprecision time range, contained in the temporal correlation domain of a GNSS code sequence, Nk being an integer higher than or equal to 3.

Next, in the second step 208 of implementation of the strategy for searching for the closest virtual beacon, the on-board GNSS receiver 182 receives the real GNSS signals at the synchronization reset times tk, k varying from 1 to Nk.

In the same second step 208, the electronic processing unit 186, which may be external to or integrated into the GNSS receiver 182, determines, for each synchronization reset time tk of the second set, k varying from 1 to Nk, and for each possible position P(i) of the virtual beacon Be(i), or each possible holding position, i varying from 1 to NBe, of the first set, the GNSS replica signals expected by the GNSS receiver 182 at the positions P(i) and times tk, for each satellite Sat(i, j, k) visible from the position P(i) at the local time tk of the receiver, i varying from 1 to NBe and k varying from 1 to Nk, j being the index of order of the set of satellites visible from a given position P(i) at a given synchronization reset time tk.

In the same second step 208, for each reset time tk of the second set and for each position P(i) of the virtual beacons of the first set, the electronic processing unit determines elementary correlations between the signals of the GNSS replicas expected at the various parking positions P(i) and various synchronization reset times tk and various satellites Sat(i, j, k) visible at each time tk, and the real GNSS signals received at the synchronization reset times tk by the on-board GNSS receiver.

In the third step 210, which is executed after or in parallel with the second step 208, and for each reset time tk of the second set, the electronic processing unit 186 determines multi-satellite correlations or likelihoods, which are, for each position P(i) of the virtual beacons of the first set and each reset time tk of the second set, equal to the quadratic sum of the elementary correlations between the real signal received by the GNSS receiver at the time tk and the signals of the replicas expected, at the reset time and for the virtual beacon having the position P(i), from the satellites Sat(i, j, k) visible from the position P(i) at the time tk.

Next, in the fourth step 212, the processing unit determines the position P(i0) of the virtual beacon Be(i0) and the reset time tk0 for which the multidimensional correlation or likelihood function is maximum and delivers this position P(i0) and this synchronization time tk0 as output data, this position and time being the most probable position of the virtual beacon and the most probable synchronization correction as regards the parking place of the train.

In an optional fifth step 214, consecutive to the fourth step 212, the electronic processing unit identifies the storage track of the train using the position of the virtual beacon determined to be closest to the train and a lookup table mapping the set of the parking virtual beacons to the set of the storage tracks.

It will be noted that the signal-to-noise ratio of the estimation of the correlation function may be improved, in a conventional way, by non-coherent integration of the outputs over a minimum duration sufficient to achieve the desired confidence in the estimation of the maximum.

It will be noted that the case where a single solution cannot be isolated with sufficient confidence (no significant maximum) is indicative of a fault in the integrity of the method and that an alarm may be generated. However, this fault may be related to the fact that the interval of exploration of the local time is not broad enough; it would then be recommended to restart the search while broadening the search time interval beyond the time estimation uncertainty domain.

Figure 4:
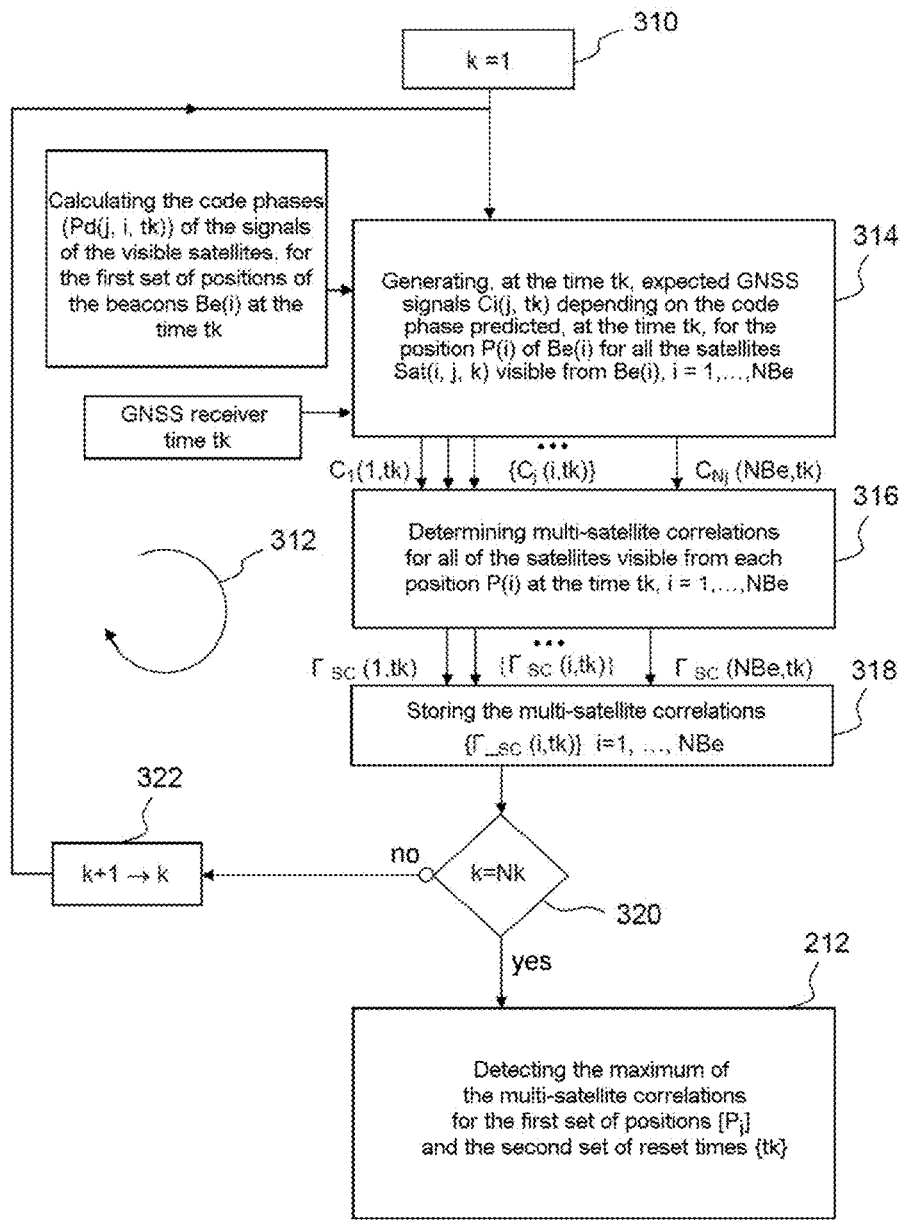
FIG. 4 is a flowchart of a first particular embodiment of the method for determining the point location of the train of FIG. 3.

According to FIG. 4 and a first particular embodiment 302 of the method for determining the point location of the train of FIG. 3, the locating method 302 comprises the initialization first step 206 of FIG. 3, a first loop 312 of substeps 314, 316, 318, 320, 322 in which reset times tk of the second set, parameterized by the index k, which varies from 1 to Nk, are scanned, and the fourth step 212 of FIG. 3.

Before the first loop 312 is executed, the index k of iteration of the reset times tk is set to 1 beforehand in the step 310 of initialization of the execution of the first loop 312.

In the first substep 314, k being set, the GNSS signals of GNSS replicas Ci(j, tk) expected, at the time tk, and at the position P(i) of the virtual beacon Be(i), are generated, for all the satellites Sat(i, j, k) visible from the virtual beacon Be(i) at the time tk, by computation, the first set of virtual beacons Be(i) being scanned via the index i (which varies from 1 to NBe) of a second loop (not shown). The phases of the GNSS replicas Ci(j, tk) expected for the virtual beacon Be(i) at the reset time tk, which are respectively designated Pd(j, i, tk) for each visible satellite Sat(i, j, k), j being an index of the satellite visible from B(i) at the time tk, are computed using ephemerides of the GNSS satellites.

In the second substep 316, which is after the first substep 314, with k set, for each position P(i) of the virtual beacon Be(i), i varying from 1 to NBe, the multi-satellite or multidimensional correlation, for the virtual beacon Be(i) at the time tk, which is designated $\Gamma_{SC}(i, tk)$, is computed as the quadratic sum of the outputs of matched filtering operations or inter-correlation functions of the signal received from the various satellites visible to the same beacon at the time tk using the expression:

$$\Gamma_{SC}(i,tk) = \Sigma_j (\Gamma_{SC}(j, i, tk))^2$$

in which:

$(\Gamma_{SC}(j, i, tk))^2$ is the square of the elementary correlation function of the GNSS signal $SIS_{GNSS}(tk)$ received by the GNSS receiver at the reset time tk and the replica signal Ci(j, tk) expected, at the virtual beacon Be(i), at the time tk and from the visible satellite, which is designated by the index j of order of the set of satellites visible from the virtual beacon Be(i) at the time tk.

In the third substep 318, which is consecutive to the second substep 316, with k set, the multi-satellite correlations at the synchronization reset time tk, i.e. the $\Gamma_{SC}(i, tk)$, are stored in an electronic memory on the first set of virtual beacons Be(i) and their associated geographical position P(i), which is described by the index i varying from 1 to NBe.

Next, in the fourth substep 320 of checking the iteration of the first loop, the index k of iteration of the reset times tk is compared to the total number Nk of reset times of the second set.

In the case where the index k is strictly lower than the total number Nk, the fifth substep 322 of unitary incrementation of the iteration index k is executed, then the first, second, third and fourth substeps 314, 316, 318 and 320 are executed again.

In the case where the index k of iteration of the first loop is equal to the total number Nk, the fourth step 212 is executed.

Figure 5:
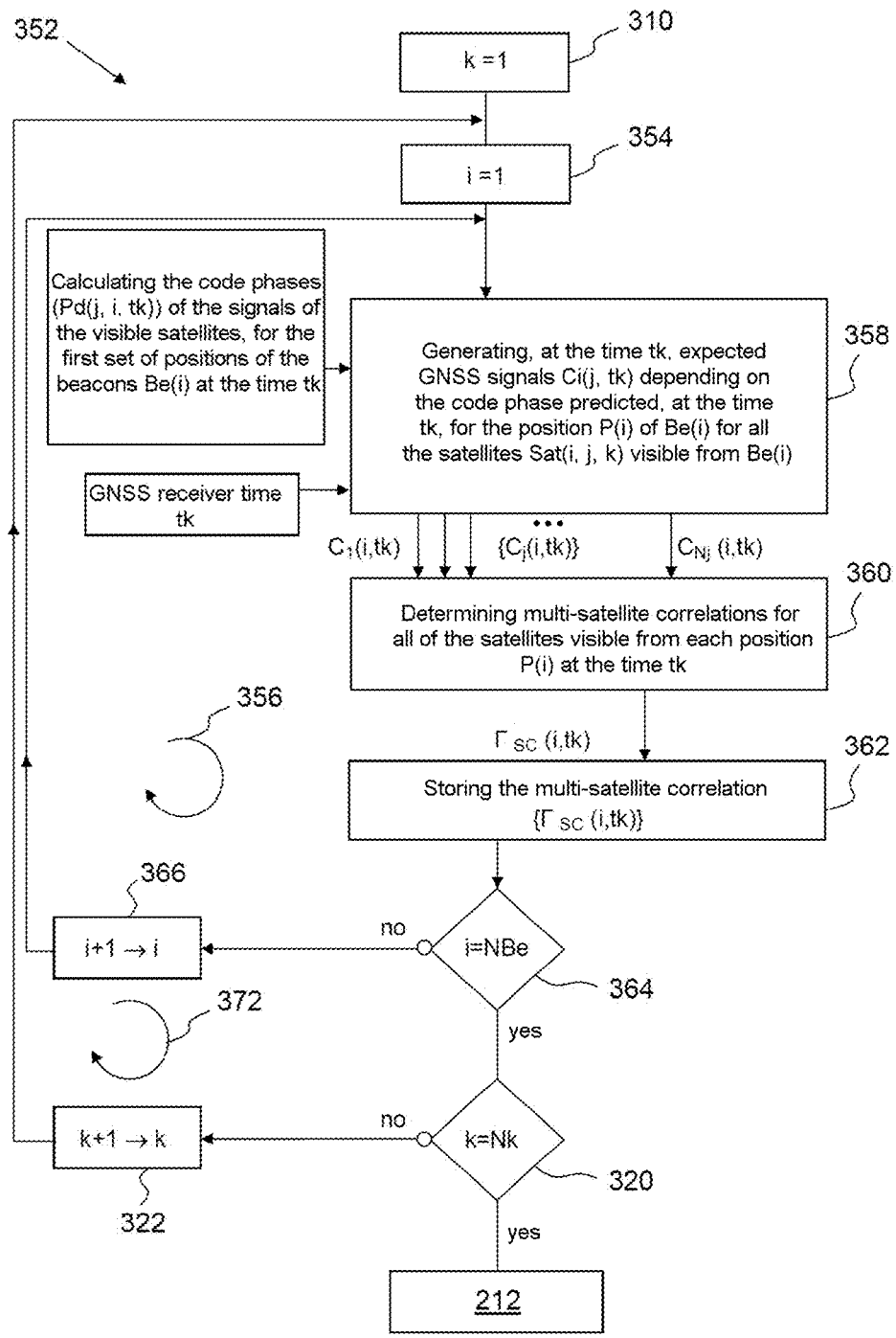
FIG. 5 is a flowchart of a second particular embodiment of the method for determining the point location of the train of FIG. 3.

According to FIG. 5 and a second particular embodiment 352 of the method for determining the point location of the train of FIG. 3, the method 352 for determining point location is derived from the locating method 302 according to the first embodiment of FIG. 4 and differs therefrom in that the first, second and third substeps 314, 316, 318 are replaced by a second loop 356 of sixth, seventh, eighth, ninth and tenth substeps 358, 360, 362, 364, 366 of scanning the positions P(i) of the virtual beacons Be(i) of the first set, which loop is parameterized with the index i varying from 1 to NBe.

The second loop 356, which is parameterized by the index k, is embedded into a first execution loop 372, which is parameterized by the index i varying from 1 to NBe, and similar to the first loop 322 of FIG. 4 in that it contains the same substeps 320, 322.

Before executing the second loop 356, the index i of order of the virtual beacons of the first set is set to 1 beforehand in a corresponding initialization step 354.

In the sixth substep 358, i and k being set, the GNSS signals of GNSS replicas Ci(j, tk) expected, at the time tk, and at the position P(i) of the virtual beacon Be(i), are generated by computation, for all the satellites Sat(i, j, k) visible from the virtual beacon Be(i) at the time tk, the index j parameterizing the satellites visible to this set. The phases of the GNSS replicas Ci(j, tk) expected for the virtual beacon Be(i) at the reset time tk, which are respectively designated Pd(j, i, tk) for each visible satellite Sat(j, i, tk), j being an index of the satellite visible from B(i) at the time tk, are computed using ephemerides of the GNSS satellites.

In the seventh substep 360, which is after the sixth substep 314, with i and k set, the multi-satellite or multidimensional correlation, at the virtual beacon Be(i) and at the time tk, which is designated $\Gamma_{SC}(i, tk)$, is computed as the quadratic sum of the outputs of matched filtering operations or intercorrelation functions of the signal received from the various satellites visible to the same beacon at the time tk using the expression:

$$\Gamma_{SC}(i,tk) = \Sigma_j (\Gamma_{SC}(j, tk))^2$$

in which:

$(\Gamma_{SC}(j, i, tk))^2$ is the square of the elementary inter-correlation function of the GNSS signal $SIS_{GNSS}(tk)$ received by the GNSS receiver at the reset time tk and the replica signal Ci(j, tk) expected, for the virtual beacon Be(i), at the time tk and from the visible satellite, which is designated by the index j of order of the set of satellites visible from the virtual beacon Be(i) at the time tk.

In the eighth substep 362, which is consecutive to the seventh substep 360, with i and k set, the multidimensional correlation or likelihood function $\Gamma_{SC}(i, tk)$ at the reset time tk is saved in an electronic memory.

Next, in the ninth substep 364 of checking the iteration of the second loop, the index i of iteration of the positions P(i) of the virtual beacons Be(i) is compared to the total number NBe of virtual beacons of the first set.

In the case where the index i is strictly lower than the total number NBe of virtual beacons, the tenth substep 366 of unitary incrementation of the iteration index i is executed, then the sixth, seventh, eighth and ninth substeps 358, 360, 362 and 364 are executed again.

In the case where the index i of iteration of the second loop is equal to the total number NBe of virtual beacons, the fourth substep 320 of checking the index k of iteration of the first loop 372 is executed.

Figure 6:
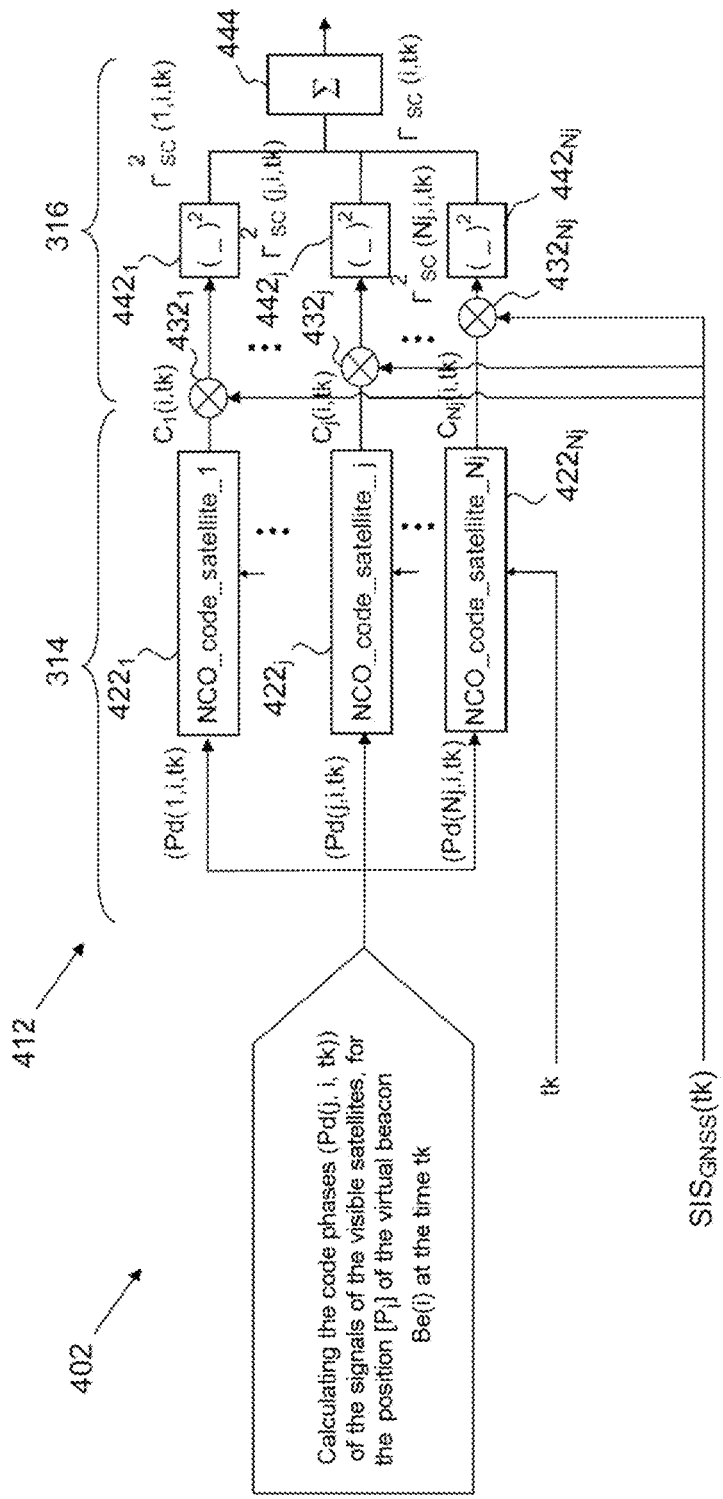
FIG. 6 is a partial view of the modular architecture of a system allowing the method for determining point location according to the second embodiment of FIG. 5 to be implemented.

In FIG. 6, an example of a modular architecture of a system 402 for partially implementing the method 352 for determining point location according to the second embodiment of FIG. 5 is illustrated.

The modular architecture shown here comprises a set 412 of modules for implementing the sixth substep 358 and the seventh substep 360, the modules possibly being software modules executed by at least one electronic processing unit, or hardware electronic modules performing particular functions.

The modules for implementing the sixth substep 358 are produced using a battery of numerically controlled oscillators $422_1, \ldots 422_j, \ldots 422_{Nj}$ (NCOs) that are arranged in parallel to generate, at the local reset time tk, expected replica PRN codes Ci(j, tk) of the satellites visible from the position P(i) of the virtual beacon Be(i), which are designated by an index j in this set of visible satellites, j varying from 1 to Nj, Nj being the total number Nj of visible satellites.

The modules for implementing the seventh substep 360 are produced using: a battery of modules $432_1, \ldots, 432_j, \ldots, 432_{Nj}$ for computing, in parallel, functions of elementary inter-correlation between the GNSS signal received by the GNSS receiver at the reset time tk and the replicas of the PRN codes expected, for the virtual beacon Be(i), from the satellites visible from said beacon Be(i) at the time tk, and modules $442_1, \ldots, 442_j, \ldots, 442_N$, for each raising an input to the power of two, followed by an Nj-input adder 444 for determining the quadratic sum of the NL elementary inter-correlation functions.

The quadratic summation of the outputs of the matched filtering operations or elementary inter-correlation functions over the various satellites visible, at a given synchronization time tk, to a given virtual beacon Be(i), is an important feature of the invention. Specifically, since the coherence of the carrier phase is not ensured with sufficient precision, because of random propagation effects (delay, multipaths), it is recommendable not to coherently sum the outputs of the tailored filtering operations or inter-correlation functions over the various satellites visible to a given beacon. In addition, the small impact of residual errors in the PRN code after correction for modelled delays on the value of the multidimensional correlation function (small error of a few meters with respect to the width of the correlation span) makes pertinent the implementation of a non-coherent or quadratic summation.

Lastly, the summation of the correlation functions makes it possible to singly remove the indeterminateness in the local time, because the projection of the time error of the local clock remains coherent (to within the time error) from the single true position of the receiver for measurements of pseudo-distances for all of the satellite axis-of-sight directions, whereas the time error projects incoherently in the axis-of-sight directions for positions not corresponding to the actual reception position.

The spatial correlation domain depends on the direction of incidence of the GNSS signal with respect to the axis of alignment passing between the observed virtual beacon B(i) and a beacon of the first set of virtual beacons and said observed beacon B(i).

Since signals "orthogonal" to the movement cannot serve to decrease positional indeterminateness, it is optionally possible to define the equivalent of a coefficient of DOP (Dilution Of Precision) to evaluate the ability to use the virtual beacon as "absolute reference" while taking into account the geometry of the satellites.

It will be recalled that, for a standard three-dimension solution, a matrix of the direction cosines of the angles of arrival is used, which matrix in fact finds its way into the system of equations to be solved.

In the case of a one-dimension solution, an equivalent rigorous criterion may be constructed. This criterion may take the form:

$$DOP = \frac{1}{Nsat} \cdot (\Sigma_j \ 1/\cos(\alpha_j))$$

in which:
DOP is the equivalent criterion,
Nsat is the number of positioning satellites,
$\alpha_j$ is the angle of arrival or of incidence of the jth satellite,
j being an index of order varying from 1 to Nsat.

It is possible, for example, to limit the satellites taken into account to those that have an angle of incidence, with respect to the direction of alignment between the observed virtual beacon and the closest virtual beacon of the first set, smaller than 60°, this corresponding to a maximum elongation of the correlation span by a factor of 2.

By way of illustration, FIG. 7 shows an example of a result obtained after quadratic summation of satellite spatial inter-correlation functions for various incidences. The curves 471 to 473 are respectively graphical representations of correlation functions for an angle of incidence of the satellite signal with respect to the direction of movement of 60°, 45° and 30°. The curve 474 is the graphical representation of the sum of the satellite correlation functions.

Advantageously, the non-coherent summations of the inter-correlation functions make it possible to increase the signal-to-noise C/N0 or detection gain by 5.log(Nsat), Nsat being the number of satellites visible from the possible position in question, with respect to a conventional GNSS detection, and thus to deliver a better sensitivity and a better precision in the time and position of detection of the maximum correlation.

Advantageously, during the computation of the multidimensional correlation function or likelihood function for the position P(i) of a given virtual beacon Be(i) and for a given synchronization reset time tk, the elementary inter-correlation functions obtained for the various satellites Sat(j) visible from the virtual beacon Be(i) at the time tk are optionally weighted taking into account a matrix of the geometric axes of sight of the visible satellites.

Generally, the elementary correlation functions are not all exactly centered on the same time (corresponding to a maximum power), synchronization differences between the signals received from the satellites (synchronization differences between different GNSS satellite clocks, propagation delays due to the ionosphere and troposphere, multipaths of a signal emitted by a given GNSS satellite) causing errors in the position of the spatial correlation function.

These differences, which are at most of the order of several tens of nanoseconds, 200 ns for example corresponding to 60 m in the pseudo-distances, result in spreading of the positions of the correlation maxima of the visible satellites.

To mitigate the effect of this spreading, and therefore the noise encountered determining whether the maximum of the correlation function has been passed, it is necessary to correct, during the generation of the local GNSS replicas of the expected PRN codes, the expected distances of the visible satellites using available error models, i.e. known models of clock error, and of errors due to the ionosphere and troposphere. These error models may be provided by the on-board GNSS receiver or via an assistance link, and allow errors in the expected distances of the satellites to be decreased to a few meters. These error models do not allow the errors caused by multipaths and interference in the PRN-code signal received from a given visible satellite to be corrected.

In addition to the detection gain achieved by the quadratic summation of the elementary inter-correlation functions over the set of satellites visible from a given virtual beacon Be(i) at a given synchronization reset time tk, the method for determining spatial location according to the invention improves the robustness of the detection of the virtual beacon Be(i0) closest to the GNSS receiver located on board the train, and therefore of the identification of the storage track Vi0 on which the train is located, with respect to specular multi paths.

Noteworthily, the position of the correlation maximum remains unchanged in the presence of specular multipaths, which are delayed with respect to the direct signal, despite the fact that the temporal correlation function is deformed and made asymmetric thereby, this explaining the robustness of the position of the correlation maximum with respect to the presence of multipaths.

Advantageously, the method for determining the point location of the virtual beacon according to the invention takes advantage of this property to make the estimation of the "highest" positional likelihood, which estimation is based solely on the estimation of the position of the correlation maximum, more robust than a simple direct position estimation, based on conventional estimation of received times using discriminators that are sensitive to distortion of the correlation function.

It is also noteworthy that the spatial correlation domain that defines the positional resolution capacity of the maximum is directly related to the waveform of the code and to the spread-spectrum technique used.

For example, in the case of a GPS C/A code the spatial correlation span of which is 300 m, it is possible to compare nearby positions in this domain with a resolution sensitivity of 0.15 dB for a 5 m spacing between beacons.

When the Galileo BoC(1,6) PRN code is used, the correlation span to the first zero is 25 m and the resolution sensitivity is improved, increasing to 2 dB for a 5 m spacing between two nearby virtual beacons.

A complete exploitation of the spectrum of the signals E5a-E5b, which are spaced apart by 30 MHz, would allow a resolution capacity of 10 m to be obtained, i.e. a resolution sensitivity of 6 dB for a separation of 5 m.

Thus the improvement in sensitivity obtained by implementing the method for determining the point location of the virtual beacon, associated with knowledge of the topographical map of the parking positions, allows the performance of the detection of the starting track in terms of probability of false alarm and of probability of non-detection to be improved.

This method for determining the point location of a virtual beacon according to the invention, by comparing the validity of the various parking positions of a vehicle based on the phase consistency of the expected replica signals with the signals received, is clearly different from a conventional locating method based on a, potentially biased, direct estimation of the GNSS position of the vehicle, that is then projected onto a known map of the storage tracks.

With respect to a standard or conventional mode of operation of the GNSS receiver, based on an individual per-satellite search, the method for determining the point location of a vehicle according to the invention is more robust to multipaths since, contrary to temporal discrimination, based on an assumed symmetry of the correlation function, the position of the single maximum correlation threshold observed for each visible satellite is not affected by the presence of multipaths, which are each delayed with respect to the satellite signal received directly.

Advantageously, the search for the best spatial match is linked to the removal of correlations between biases, associated with multipaths reflected from one reception position to another, to which the GNSS signals may be subject, this decreasing the risk of existence of a bias that remains stable throughout the spatial correlation function and that, just like the standard method for estimating the time of arrival by advance/delay correlation, would lead to a bias in the determination of the position of the maximum correlation peak.

Preferably but non-limitingly, the method and system for determining point location according the invention may be used in the field of rail transportation to determine the starting position of a train among a set of parking positions known a priori.

Generally, the method for determining and the system for determining point location according to the invention may be applied to any means of locomotion or land vehicle stored or parked on one curvilinear or rectilinear segment, forming a departure track, of a set of curvilinear or rectilinear segments that are spaced sufficiently far apart and form departure tracks. This may for example be the case, in the field of seafaring, when it is desired to locate ships held in "seaways", or, in the field of land transport for example, when it is desired to locate mass-transport vehicles held in queing lines.

Preferably but non-limitingly, the present invention will be applied to the field of rail transportation.

By electronic processing unit, what is meant here is a system comprising one or more microprocessors, processors, computers or any other equivalent means, able to suitably programmed to implement the various computational operations implemented in the context of the method according to the invention.

Another subject of the present invention is a computer-program product containing instructions that are readable by a computer or any other type of equivalent computational device that, when they are executed on a processor, cause the processor to execute the method for determining the point location of a vehicle stopped on a storage track.

The invention claimed is:

1. A method for determining the point location of a vehicle stopped on one storage track among a set of storage tracks, using virtual beacons, the location-determining method being implemented by a system for determining point location comprising:
 a GNSS receiver located on board the vehicle, able to directly measure pseudo-distances set to a synchronized local time base within a synchronization imprecision time range, using geo-positioning signals emitted by GNSS geo-positioning satellites visible to said GNSS receiver; and
 an electronic processing unit that is external to or integrated into the GNSS receiver, the method for determining point location comprising a set of steps wherein:
 the likelihood of a plurality of hypotheses as to the stopped location of the vehicle, corresponding to a first set of an integer number NBe of predefined virtual beacons Be(i), i varying from 1 to NBe, the respective positions of which are known in an amount of at least one virtual beacon per storage track, is determined and compared by the electronic processing unit by correlating the GNSS geo-positioning signals, received at various times of a second set by the GNSS receiver located on board the vehicle with predicted GNSS geo-positioning signals of replicas expected for said various positions of the virtual beacons Be(i) of the first set at the various times, and
 the detected parking position of the vehicle is the position that corresponds to the maximum likelihood.

2. The method for determining the point location of a vehicle as claimed in claim 1, wherein, to decrease the mismatch due to a poor synchronization of the local time reference of the GNSS receiver with respect to the time of the GNSS global positioning system, the imprecision time range of the synchronization of the local clock is covered by the electronic processing unit by dividing in a predefined way said imprecision time range into time segments, respectively represented by synchronization reset times $t_k$, k varying from 1 to Nk, with Nk designating the number of synchronization reset times in the imprecision time range, the correlations of the GNSS geo-positioning signals received by the on-board GNSS receiver being performed at said synchronization reset times $t_k$.

3. The method for determining the point location of a vehicle as claimed in claim 2, wherein the correlations of the GNSS geo-positioning signals received by the on-board GNSS receiver at the various positions P(i) of the virtual beacons Be(i), i varying from 1 to NBe, and at the various times tk, k varying from 1 to Nk, are multi-satellite correlations with corresponding replica GNSS signals expected for each position P(i) at the time tk and from the satellites Sat(i, j, k) visible from said position P(i) of the virtual beacon Be(i) at the time tk, the multi-satellite correlation for the position P(i) at the synchronization reset time tk, i varying from 1 to NBe and k varying from 1 to Nk, being equal to the quadratic sum, over the set of the satellites visible from the position P(i) at the reset time tk, of the elementary correlations between the actual GNSS signal received for the position P(i) at the time tk by the GNSS receiver and the GNSS replicas expected at the time tk and at the position Pi from the satellites Sat(i, j, k) visible from the beacon Be(i) at the time tk.

4. The method for determining the point location of a vehicle as claimed in claim 1, wherein the set of steps comprises an initialization phase, a phase of searching for the position of the virtual beacon closest to the holding position of the vehicle using a predefined strategy, and a phase of exploiting the searching phase, wherein phase the storage track Vi0 is identified based on the virtual beacon B(ei0) estimated to be closest to the vehicle, and a priori knowledge of the positions P(i) of the virtual beacons Be(i), which positions are set and predefined, i varying from 1 to NBe.

5. The method for determining the point location of a vehicle as claimed in claim 1, wherein the initialization phase of the set of steps comprises a first initialization step wherein the first set of possible positions P(i) of the virtual beacons Be(i), i varying from 1 to NBe, corresponding to the possible storage tracks Vi of the vehicle, is determined from a database of topographical data, which database may be external to the GNSS receiver or may be included in a database memory of the GNSS receiver, and synchronization reset times tk, k varying from 1 to Nk, forming a second set of hypotheses, are determined in the synchronization imprecision time range so as to be substantially regularly spaced apart, Nk being an integer higher than or equal to 3, the synchronization imprecision time range being included in the temporal correlation domain of a GNSS PRN code sequence or being determined using an integrity-protection time radius computed from time data of an RAIM function, which is either integrated into or external to the GNSS receiver.

6. The method for determining the point location of a vehicle as claimed in claim 5, wherein the difference between the actual position of the GNSS receiver along the storage track on which the vehicle is parked and the position of the associated virtual beacon is smaller than an imprecision spatial interval the equivalent temporal effect of which on the temporal correlation precision is clearly lower than the temporal correlation domain of the GNSS PRN code sequence used.

7. The method for determining the point location of a vehicle as claimed in claim 5, wherein the phase of searching for the closest virtual beacon comprises a second step wherein:
  the on-board GNSS receiver receives the real GNSS signals at the synchronization reset times tk, k varying from 1 to Nk, and
  the electronic processing unit determines, for each synchronization reset time tk of the second set of hypotheses, k varying from 1 to Nk, and for each possible position P(i) of the virtual beacon Be(i) of the first set, i varying from 1 to NBe, the GNSS replica signals expected by the GNSS receiver at the positions P(i) and times tk for each visible satellite Sat(i, j, k) at the local time tk of the receiver, i varying from 1 to NBe and k varying from 1 to Nk; then
  for each reset time tk of the second set and for each position P(i) of the virtual beacons of the first set, the electronic processing unit determines elementary correlations between, on the one hand, the signals of the GNSS replicas expected at the various holding positions P(i) and various synchronization reset times tk and from the various satellites visible at each time tk and the actual GNSS signals received at the synchronization reset times tk by the GNSS receiver located on board the vehicle.

8. The method for determining the point location of a vehicle as claimed in claim 7, wherein the phase of searching for the virtual beacon closest to the vehicle comprises a third step, executed after or in parallel with the second step wherein, for each reset time tk of the second set and for each position P(i) of the virtual beacons of the first set, the electronic processing unit determines multi-satellite correlations, forming a value of the likelihood function, and equal, for each position P(i) of the virtual beacons of the first set and each reset time tk of the second set, to the quadratic sum of the elementary correlations between the signal between the GNSS signal received by the GNSS receiver at the time tk and the replica signals expected, at the time tk for the position P(i) of the virtual beacon, from the visible satellites Sat(i, j, k) visible from the position P(i) at the time tk.

9. The method for determining the point location of a vehicle as claimed in claim 8, wherein the phase of searching for the closest virtual beacon comprises a fourth step, executed after the third step wherein, the electronic processing unit determines the position P(i0) of the virtual beacon and the reset time tk0 that maximizes the likelihood function for the first set of positions P(i) and the second set of reset times tk, the position P(i0) thus determined being the position of the virtual beacon Be(i0) detected to be closest to the on-board receiver.

10. The method for determining the point location of a vehicle as claimed in claim 9, furthermore comprising a fifth step, executed after the fourth step wherein:
  the electronic processing unit identifies the storage track on which the vehicle is stopped on the basis of the position P(i0) of the virtual beacon detected to be closest and of a lookup table mapping all of the virtual beacons to all of the storage tracks; and/or
  the electronic processing unit delivers information on the detected synchronization reset time tk0 to a mechanism for correcting a drift in the local clock of the GNSS detector; and/or
  the electronic processing unit raises an alarm in case of failure to identify the storage track and starts exploration in a broader temporal synchronization imprecision domain.

11. The method for determining the point location of a vehicle as claimed in claim 7, wherein, for each virtual-beacon position (Pi), the set of satellites visible at a given time tk from all the virtual beacons Be(i), i varying from 1 to NBe, is identical and independent of the index i of order of the virtual beacons and dependent on the time tk only.

12. The method for determining the point location of a vehicle as claimed in claim 1, wherein the integrity of the location is checked via an additional step wherein it is verified that the maximum likelihood is higher than a predefined safety threshold guaranteeing the integrity of the location.

13. A device for determining the point location of a vehicle stopped on one storage track among a set of storage tracks, using virtual beacons, comprising:
- a GNSS receiver, located on board the vehicle, able to directly measure pseudo-distances set to a synchronized local time base within a precision time range, using geo-positioning signals emitted by GNSS geo-positioning satellites visible to said receiver; and
- an electronic processing unit that is external to or integrated into the GNSS receiver, the device for determining point location being wherein the electronic processing unit is configured to:

determine and compare the likelihood of a plurality of hypotheses as to the stopped location of the vehicle, corresponding to a first set of an integer number NBe of predefined virtual beacons Be(i), i varying from 1 to NBe, the respective positions of which are known in an amount of at least one virtual beacon per storage track, by correlating the GNSS geo-positioning signals received at various times of a second set by the GNSS receiver located on board the vehicle with predicted GNSS geo-positioning signals of replicas expected for said various positions of the virtual beacons of the first set at the various times, and detecting the current storage track position of the vehicle to be the position corresponding to the maximum likelihood.

14. The device for determining the point location of a vehicle as claimed in claim 13, wherein, to decrease the mismatch due to a poor synchronization of the local time reference of the GNSS receiver with respect to the time of the GNSS global positioning system:

the electronic processing unit is configured to cover the imprecision time range of the local clock by dividing in a predefined way said imprecision time range into time segments, respectively represented by synchronization reset times tk, k varying from 1 to Nk, with Nk designating the number of synchronization reset times in the imprecision time range, the correlations of the GNSS geo-positioning signals received by the on-board GNSS receiver being performed at said synchronization reset times tk; and the correlations of the GNSS geo-positioning signals received by the on-board GNSS receiver for the various positions P(i) of the virtual beacons Be(i), i varying from 1 to NBe, and at the various times tk, k varying from 1 to Nk, are multi-satellite correlations with corresponding replica GNSS signals expected for each position P(i) at the time tk and from the satellites Sat(i, j, k) visible from said position P(i) of the virtual beacon Be(i) at the time tk, the multi-satellite correlation for the position P(i) at the synchronization reset time tk, i varying from 1 to NBe and k varying from 1 to Nk, being equal to the quadratic sum, over the set of the satellites visible from the position P(i) at the reset time tk, of the elementary correlations between the actual GNSS signal received for the position P(i) at the time tk by the GNSS receiver and the GNSS replicas expected at the time tk and at the position Pi from the satellites Sat(i, j, k) visible from the beacon Be(i) at the time tk.

15. The device for determining the point location of a vehicle as claimed in claim 14, wherein the electronic processing unit is configured to determine the synchronization imprecision time range by including it in the temporal correlation domain of a GNSS PRN code sequence or by computing an integrity-protection time radius from time data of an RAIM function, the RAIM function being integrated into or external to the GNSS receiver.

16. A system for determining the point location of a vehicle stopped on one storage track among a set of storage tracks, using virtual beacons, comprising:
- a GNSS global satellite geo-positioning system, and
- a device for determining the point location of a vehicle as claimed in claim 12 preferably enhanced by an RAIM function implemented within the GNSS receiver or within a second GNSS receiver separate from the first GNSS receiver;

the vehicle being:

a land vehicle, parked on a land storage track, preferably a train held on a storage track, or a sea vehicle, held on a seaway.

17. A computer-program product containing computer-readable instructions that, when they are executed on a processing unit, cause the processing unit to execute the method for determining the point location of a vehicle stopped on one storage track among a set of storage tracks, using virtual beacons, as claimed in claim 1.

* * * * *